3,037,050
REGENERATION OF TEREPHTHALIC ACID DI-METHYL ESTER FROM POLYETHYLENE TEREPHTHALATE
Erwin Heisenberg, Erlenbach (Main), Erhard Siggel, Laudenbach (Main), and Rudolf Lotz, Obernburg (Main), Germany, assignors to Vereinigte Glanzstoff-Fabriken A.G., Wuppertal-Elberfeld, Germany
No Drawing. Filed Feb. 25, 1960, Ser. No. 10,847
Claims priority, application Germany Aug. 5, 1955
10 Claims. (Cl. 260—475)

This invention relates to a process for the regeneration of terephthalic acid dimethyl ester from polyethylene terephthalate, and more particularly to an improved regeneration process in which the dimethyl ester of terephthalic acid is obtained directly from the polyester.

The present application is a continuation-in-part of each of our copending applications, Serial No. 601,381, filed August 1, 1956, and Serial No. 601,382, filed August 1, 1956, both abandoned, the disclosures of which are incorporated herein by reference as fully as if they had been set forth in their entirety.

It has become an important consideration in the manufacture of polyethylene terephthalate materials to recover or salvage badly dyed, dirty or otherwise spoiled waste material in the form of threads, fibers, ribbons, films or similar compact masses of the polyester. A familiar practice has been to decompose the polyethylene terephthalate by conversion with boiling glycols to form diglycol esters of terephthalic acid. However, the diglycol esters obtained in this manner are always contaminated and, as experience has shown, can be cleaned only with the utmost difficulty. According to another known process, the polyethylene terephthalate in the spoiled waste material is decomposed with strong mineral acids to terephthalic acid. This procedure is both complicated and uneconomical since the terephthalic acid obtained is also contaminated and, furthermore, must be again esterified in subsequent steps if the dimethyl ester product is to be produced.

One object of the present invention is to provide an improved process for the regeration of terephthalic acid dimethyl ester from polyethylene terephthalate which is particularly advantageous in salvaging badly dyed, dirty, or otherwise spoiled polyester waste material in the form of threads, fibers, ribbons, films, or similar compact masses of the polyester.

Another object of the invention is to provide an improved process for regeneration of terephthalic acid dimethyl ester from polyethylene terephthalate in which a pure dimethyl ester can be produced directly from a contaminated polyester with very high yields.

Another object of the invention is to provide an improved process for regeneration of terephthalic acid dimethyl ester from polyethylene terephthalate which can be carried out in a continuous operation at substantially atmospheric pressure.

Still another object of the invention is to provide an improved process for regeneration of terephthalic acid dimethyl ester from polyethylene terephthalate in which the polyester waste material is more easily handled and provides a more uniform operation.

Still another object of the invention is to provide a particularly effective catalyst for use in the regeneration of terephthalic acid dimethyl ester from polyethylene terephthalate.

Yet another object of the invention is to provide an improved process for regeneration of terephthalic acid dimethyl ester from polyethylene terephthalate whereby a suitable esterification catalyst is more easily incorporated with the reactant materials.

These and other objects and advantages of the invention will become more apparent upon a consideration of the following description.

In accordance with the present invention, it was first discovered that terephthalic acid dimethyl ester could be recovered with relatively good yields by treating polyethylene terephthalate in the form of bulky or lumpy solid masses with superheated methanol vapor, advantageously heated to a temperature of about 220° C. to 250° C., in the presence of any suitable esterification catalyst such as orthophosphoric acid or metaphosphoric acid, the reaction being carried out at substantially atmospheric pressure. The dimethyl terephthalate being produced is recovered from a stream of excess methanol vapor by sublimation in a cooled condenser after passage through an activated carbon layer which removes certain impurities. The dimethyl terephthalate can then be readily recrystallized from methanol to obtain a high degree of purity.

One principal advantage of this treatment of the solid polyethylene terephthalate with methanol vapor resides in the fact that high pressures and the use of corresponding high pressure apparatus, such as autoclaves, can be avoided. Of course, the use of methanol vapor in this manner also permits a direct conversion of the polyester to the monomeric ester which can then be directly employed in the known polycondensation reaction to obtain the polyester. Furthermore, a continuous operation is possible when the regeneration is carried out under substantially atmospheric pressure.

The basic process of the invention can be more advantageously and successfully carried out if the polyester is treated in its molten state instead of in the form of bulky or lumpy solid masses. Thus, the invention contemplates the regeneration of terephthalic acid dimethyl ester from polyethylene terephthalate by melting polyethylene terephthalate, and reacting the molten polyethylene terephthalate in the presence of an esterification catalyst with methanol vapor heated to from about 220° C. to 300° C., preferably from about 240° C. to about 250° C.

It is possible to conduct the superheated methanol vapor through a molten mass of polyethylene terephthalate which contains a small quantity of an esterification catalyst. The terephthalic acid dimethyl ester being formed or produced in the reaction is removed from the reaction chamber with excess methanol vapor, passed through an activated carbon layer, and recovered by condensation or sublimation in a cooled condenser.

It is particularly advantageous, however, to melt the polyethylene terephthalate in an inert atmosphere such as nitrogen, extrude the molten polyethylene terephthalate in thread form into a reaction chamber or zone, and contact the thread form of the molten polyethylene terephthalate in the presence of an esterification catalyst with methanol vapor heated to from about 220° C. to 300° C., and then recover the terephthalic acid dimethyl ester produced thereby. In this preferred execution of the process, the polyester waste material can be melted upon a grid or other suitable apparatus at a constant rate of melting and then compressed or extruded by a pump or other suitable means through a metal plate having an appropriate number of holes situated therein in order to produce a plurality of threads.

The extruded threads preferably have a diameter of up to about 3 mm. Relatively thick threads can thereby be formed which are then introduced into a reaction chamber or zone, preferably so as to fall or drop freely therethrough. Immediately after being extruded into the reaction zone, the threads are sprayed with the esterification catalyst which can be introduced by a suitable atomizing device, spray nozzle or the like. The threads are contacted in the reaction chamber or zone with the superheated methanol vapor so as to produce terephthalic acid dimethyl ester as the threads drop freely through the chamber. The terephthalic acid dimethyl ester can then be recovered from the lower end of the reaction chamber and subsequently purified.

Among the various well known esterification catalysts, the aryl sulfonic acids have been found to give the best results an dare generally superior to such catalysts as zinc, zinc oxide and lead oxide. By employing an aryl sulfonic acid, it is also possible to obtain an improved yield when the reaction is carried out over a broad range of temperatures and pressures, e.g. from about 65° C. to 300° C. and from about 1 to 35 atmospheres, and various procedures can be employed with an equally improved effectiveness of catalytic action. For example, polyethylene terephthalate can be reacted with methanol vapor at a temperature of about 165° C. to 200° C. and a pressure of from about 20 to 35 atmospheres in the presence of the arylsulfonic acid catalyst. Also, however, polyethylene terephthalate is advantageously reacted with methanol at a temperature of from about 220° C. to 300° C. and under substantially atmospheric pressure, particularly when the polyester is reacted in its molten state, preferably as a plurality of molten threads, an appropriate amount of an aryl sulfonic acid being added thereto. A very high yield of the dimethyl ester is obtained in these reactions, the product containing methanol and, in part, glycol. By recrystallization from methanol, a very pure terephthalic acid dimethyl ester is easily obtained.

The class of compounds designated as aryl sulfonic acids are well known catalysts for a large number of different reactions. However, it was quite surprising and unexpected to find that the particular reaction under consideration could be substantially improved by the presence of these compounds. Normally, it would be expected that any useful catalytic effect would probably extend to the side reactions of this process thereby negating the possibility of obtaining high yields of the desired product.

The catalytic effect of the aryl sulfonic acids is particularly favorable if they are used in a quantity of up to about 5% by weight of the polyethylene terephthalate reactant, ideally in a quantity of about 1.5% to 3% by weight of polyethylene terephthalate. Mixtures of the catalysts can also be employed.

The lower molecular weight aryl sulfonic acids are particularly useful, preferably including the sulfonated monocyclic to tricyclic aromatic hydrocarbons, i.e. the sulfonic acids of benzene, naphthalene and anthracene and their lower alkyl substituted derivatives, such as benzene sulfonic acid, benzene disulfonic acid, toluene sulfonic acid, naphthalene sulfonic acid, naphthalene disulfonic acid, methyl-naphthalene sulfonic acid, and anthracene sulfonic acid. Another suitable aryl sulfonic acid is p-chloro-benzene sulfonic acid.

A phosphoric acid catalyst has also given favorable results when treating the molten polyethylene terephthalate. However, other well known esterification catalysts can also be employed and are more easily incorporated into the molten threads or molten mass of polyethylene terephthalate than is possible with the solid polyester. The necessary quantity of catalyst employed in any given case can be readily determined by simple experimentation.

The invention is further illustrated but not limited by the following examples:

Example 1

2 kilograms of polyethylene terephthalate in the form of a waste material are melted in a nitrogen atmosphere upon a melting grid at the rate of 40 grams per minute. The molten polyethylene terephthalate is extruded or pressed by a pump through a nozzle plate containing about 200 holes, each hole having a diameter of approximately 1 mm. After being extruded, the molten threads are introduced into the top of a vertical cylindrical shaft. The thick threads are sprayed with orthophosphoric acid immediately after their emergence from the nozzle plate. At the same time, 3 liters of methanol are heated to 245° C. and conducted into the shaft for reaction with the molten threads dropping freely through the shaft. Terephthalic acid dimethyl ester is recovered from the lower end of the shaft and then purified.

Example 2

20 kilograms of polyethylene terephthalate, as dirty waste material in the form of fibers or threads, are mixed in an autoclave with 24 liters of methanol and 1000 grams β-naphthalene sulfonic acid.

The autoclave is kept under a pressure of 35 atmospheres for five hours at a temperature of 190° C. After cooling, the crude ester is obtained in the form of a white friable mass, from which, after purification by recrystallization from methanol, the terephthalic acid dimethyl ester can be obtained in pure form. The yield is 80%.

Example 3

20 kilograms of polyethylene terephthalate waste material, which is in the form of discolored compact masses, are mixed in an autoclave with 24 liters of methanol and 500 grams of benzene sulfonic acid. The autoclave is kept under a pressure of 20 atmospheres and a temperature of 165° C. for 5 hours. After cooling the reaction mass and cleaning the crude ester, an especially pure terephthalic acid dimethyl ester can be obtained. The yield is 78%.

Example 4

20 kilograms of polyethylene terephthalate waste material are melted in a suitable reaction vessel. The reaction vessel is designed in such a way that the melt can be conducted or extruded through a sieve plate whereby the molten polyethylene terephthalate can be introduced into a reaction chamber in the form of thick threads. 400 grams of benzene disulfonic acid are added to the molten threads. At the same time, 24 liters of methanol are vaporized and conducted through the reaction chamber as methanol vapor at a temperature of 245° C. for approximately 6 hours. The terephthalic acid dimethyl ester formed is conducted with excess methanol through an activated carbon layer and then recovered in a cooled condenser. After recrystallization in methanol, the terephthalate acid dimethyl ester is obtained in an especially pure form. The yield is 90%.

The invention is hereby claimed as follows:

1. An improved process for the regeneration of terephthalic acid dimethyl ester from polyethylene terephthalate which comprises melting said polyethylene terephthalate in an inert atmosphere, and contacting the molten polyethylene terephthalate at substantially atmospheric pressure in the presence of an esterification catalyst with methanol vapor heated to from about 65° C. to 300° C.

2. The improved process as claimed in claim 1 wherein the methanol vapor is heated to from about 240° C. to 250° C.

3. The improved process as claimed in claim 1 wherein the reaction is carried out in the presence of a phosphoric acid as the esterification catalyst.

4. The improved process as claimed in claim 1 wherein the reaction is carried out in the presence of an aryl sulfonic acid as the esterification catalyst.

5. An improved process for the regeneration of terephthalic acid dimethyl ester from polyethylene terephthalate which comprises melting polyethylene terephthalate in an inert atmosphere, incorporating an esterification catalyst with the molten polyethylene terephthalate, extruding the molten polyethylene terephthalate in thread form into a reaction zone, contacting the thread form of said molten polyethylene terephthalate in said reaction zone at substantially atmospheric pressure and in the presence of said esterification catalyst with methanol vapor heated to from about 220° C. to 300° C., and recovering the terephthalic acid dimethyl ester produced thereby.

6. An improved process as claimed in claim 5 wherein the esterification catalyst is a phosphoric acid.

7. An improved process as claimed in claim 5 wherein the esterification catalyst is an aryl sulfonic acid.

8. An improved process as claimed in claim 5 wherein the esterification catalyst is β-naphthalene sulfonic acid.

9. An improved process as claimed in claim 5 wherein the esterification catalyst is benzene sulfonic acid.

10. An improved process as claimed in claim 5 wherein the molten polyethylene terephthalate is extruded into said reaction zone as a plurality of threads having an individual diameter of up to about 3 millimeters.

References Cited in the file of this patent

UNITED STATES PATENTS

| | | |
|---|---|---|
| 2,465,319 | Whinfield et al. | Mar. 22, 1949 |
| 2,534,028 | Izard | Dec. 12, 1950 |
| 2,776,985 | McKinnis | Jan. 8, 1957 |